Jan. 9, 1951 A. PASSAROTTI 2,537,697
BRAKE HOLDING ATTACHMENT FOR MOTOR VEHICLES
Filed Sept. 13, 1949 2 Sheets-Sheet 1
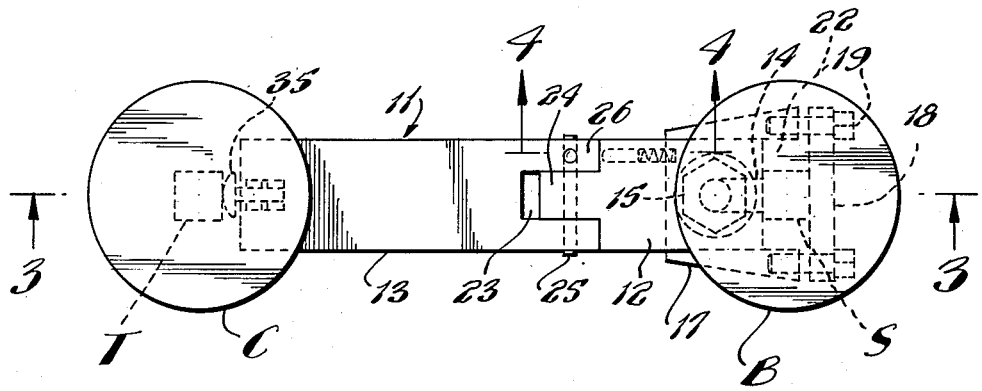
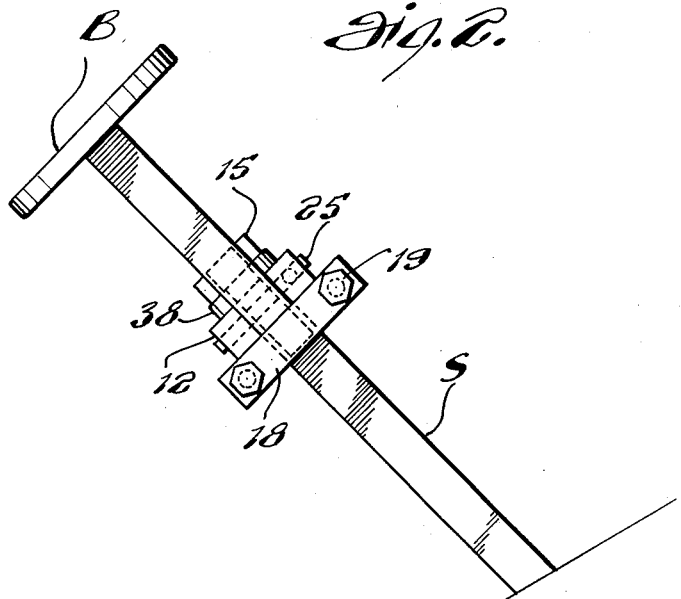
INVENTOR.
ANTHONY PASSAROTTI
BY
Clark & Ott
ATTORNEYS Jan. 9, 1951  A. PASSAROTTI  2,537,697
BRAKE HOLDING ATTACHMENT FOR MOTOR VEHICLES
Filed Sept. 13, 1949  2 Sheets-Sheet 2
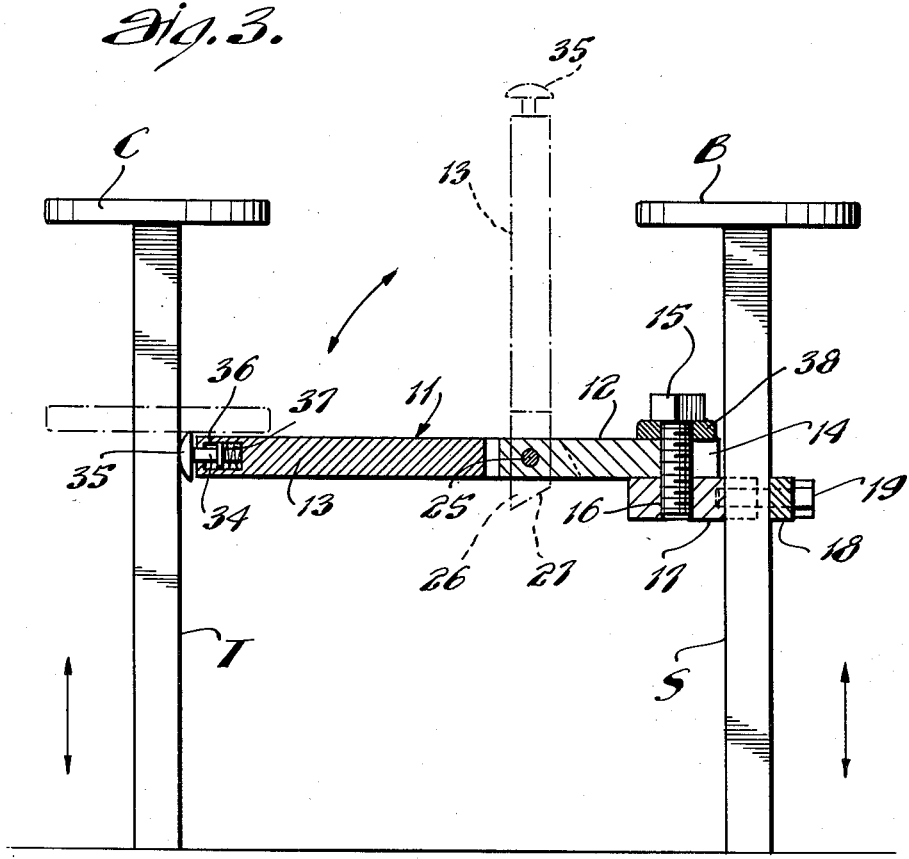
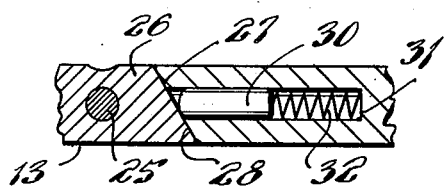
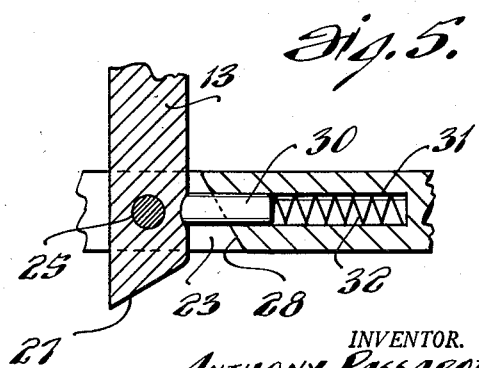
INVENTOR.
ANTHONY PASSAROTTI
BY
Clark & Ott
ATTORNEYS Patented Jan. 9, 1951

2,537,697

UNITED STATES PATENT OFFICE 2,537,697

BRAKE HOLDING ATTACHMENT FOR MOTOR VEHICLES

Anthony Passarotti, North Bergen, N. J.

Application September 13, 1949, Serial No. 115,469

1 Claim. (Cl. 74—478)

This invention relates to a brake holding attachment for motor vehicles.

The invention comprehends an attachment adapted to be affixed to the foot pedal brake of a motor vehicle such as a pleasure automobile, truck and the like for applying the brakes when the clutch pedal is depressed and for holding the same in applied relation during the time that the clutch is disengaged.

Another object of the invention is to provide a brake holding attachment which is adapted to be thrown into engagement with the clutch pedal for applying the brake when the clutch pedal is depressed and which is automatically disengaged from the clutch pedal when the same is released to throw the clutch into engagement.

Another object of the invention is to provide a brake holding attachment having a pivoted arm adapted to be swung into tensioned engagement with the clutch pedal for applying the brakes and which is automatically disengaged from the clutch pedal when the clutch pedal is released.

Still another object of the invention is to provide a brake holding attachment which is particularly applicable for holding the brakes in applied relation when the motor vehicle stops on a hill.

With the foregoing and other objects in view, reference is now made to the following specification and accompanying drawings in which the preferred embodiment of the invention is illustrated.

Fig. 1 is a plan view of a brake holding attachment constructed in accordance with the invention and shown in position affixed to a foot pedal brake and in engagement with the clutch pedal of a motor vehicle.

Fig. 2 is an end view of the attachment shown in fixed position on the foot pedal brake.

Fig. 3 is a vertical sectional view taken approximately on line 3—3 of Fig. 1.

Fig. 4 is a longitudinal sectional view taken approximately on line 4—4 of Fig. 1.

Fig. 5 is a similar view with the outer end of the attachment swung to vertical relation.

Referring to the drawings by characters of reference, the attachment is adapted to be affixed at one end to the shank S of the foot pedal brake B of a motor vehicle such as a pleasure car, truck and the like with the opposite end thereof adapted to be thrown into engagement with the shank T of the clutch pedal C so as to effect downward movement of the foot pedal brake to apply the brakes when the clutch pedal C is depressed to disengage the clutch.

The attachment comprises a flat bar 11 which includes a short inner section 12 affixed to the shank S of the foot pedal brake B and a relatively longer outer section 13 pivotally connected to the fixed section 12 for movement from an upright relation therewith to a longitudinally aligned relation in which the outer end thereof is tensioned against the shank T of the clutch pedal C. The inner section 12 is formed with a longitudinally extending slot 14 in the outer end thereof through which protrudes a screw stud 15 with its lower end threadedly engaged in an opening 16 in a head 17 and adapted to be adjusted longitudinally of the slot for adjustably connecting the bar with the head to vary the effective length of the bar. The head 17 is provided with a cross-bar 18 secured against the end thereof by studs 19 so as to dispose the cross-bar in bridging relation with a recess 22 opening through the end of the head and adapted to receive the shank S of the foot pedal brake with the cross-bar clamped against the shank thereof for securing the attachment to the foot pedal brake.

The outer section 13 is pivotally connected with the inner section 12 thereof to permit swinging movement of the outer section from aligned relation with the inner section to an upright relation therewith as shown in broken line in Fig. 3 of the drawings. For this purpose the outer section 13 is bifurcated to provide a medial slot 23 in which a medial tongue 24 formed on the end of the inner section 12 is pivotally arranged on a crosspin 25. The ends of the furcations 26 are formed with beveled faces 27 which are adapted to abut against complementary beveled face portions 28 on the opposite sides of the tongue 24 of the inner section 12 so as to limit the downward swinging movement of the outer section and hold the same in longitudinal alignment with the inner section when swung to downward position.

In order to provide means for automatically swinging the outer section 13 from aligned relation with the inner section to an upright relation therewith when the clutch pedal C is raised, the inner section is provided with a cylindrical plunger 30 arranged for reciprocatory movement in a cylindrical bore 31 opening through one of the beveled face portions 28 thereof with a coiled expansion spring 32 interposed between the bottom of the bore and the inner end of the plunger for tensioning the same against the beveled face 27 of one of the furcations 26. The outer free end of the outer section 13 is formed with a plunger 34 having a headed outer end 35 with the shank of the plunger mounted in a cylindrical bore 36 opening through the end of said section and having a coiled expansion spring 37 tensioned against the inner end of said plunger for resiliently tensioning the head 35 against the shank T of the clutch pedal C when the outer section 13 is swung to longitudinal alignment with the inner section 12.

When applying the attachment to the foot pedal brake of a motor vehicle, the head 17 is secured to the shank thereof and the bar 11 adjusted with reference to the head 17 to provide for the proper tensioning of the plunger 34 against the shank of the clutch pedal C when the outer section 13 is arranged in alignment with the inner section 12. This is effected by loosening the screw stud 15 and adjusting the same longitudinally of the slot 14 so that the head 35 of the plunger 34 resiliently engages against the shank T of the clutch pedal C when the outer section 13 is in alignment with the inner section after which the screw stud 15 is tightened in the opening 16 of the head 17 to thereby tighten the washer 38 against the upper face of the inner section 12.

In use and operation the outer section 13 of the attachment is normally arranged in upright relation and when it is necessary to stop the motor vehicle, particularly on a hill, the outer section 13 is engaged by the foot of the operator to swing the same from the upward position shown in broken lines in Fig. 3 of the drawings to the aligned position with the inner section 12 in which position the head 35 of the plunger 34 engages against the shank T of the clutch pedal C. The operator then depresses the clutch pedal C to disconnect the clutch and stop the vehicle which downward movement of the clutch pedal causes the head of the clutch pedal to engage the outer end of the outer section 13 and move the same downwardly so as to depress the foot pedal brake B to thereby apply the brakes of the motor vehicle. The brakes are retained in applied condition during the time that the clutch pedal C is retained in depressed relation. When the clutch pedal C is released to start the car, the upward movement thereof releases the attachment and permits the foot pedal brake to rise so as to release the brakes. The upward movement of the shank T of the clutch pedal moves the outer end of the outer section 13 therewith out of aligned position with the inner section 12 whereupon the plunger 30 swings the outer section 13 to the upright position shown in broken lines in Fig. 3 of the drawings.

What is claimed is:

In a brake holding attachment for motor vehicles, a bar, a head affixed to one end of said bar and having means adapted for attaching the same to the shank of the foot pedal brake of a motor vehicle, said bar having an outer section pivotally connected therewith for swinging movement from an upright relation to a lowered relation and adapted to engage against the shank of the clutch pedal when in said lowered relation for depressing the foot pedal brake to thereby apply the brakes of the vehicle by the depressing of the clutch pedal, said bar having means resiliently tensioned against the outer section thereof for swinging the same from said lowered position to the upright relation out of engagement with the clutch pedal, and said outer section having a resilient plunger extending outwardly from the end thereof and adapted to tension the outer section against the shank of the clutch pedal when in engagement therewith.

ANTHONY PASSAROTTI.

REFERENCES CITED

The following references are of record in the file of this patent:

UNITED STATES PATENTS

| Number | Name | Date |
|---|---|---|
| 1,526,999 | Mizner | Feb. 17, 1925 |
| 1,820,359 | Manning | Aug. 25, 1931 |
| 1,979,029 | Fetter | Oct. 30, 1934 |
| 2,078,324 | Griffiths | Apr. 27, 1937 |
| 2,451,700 | Van Trine | Oct. 19, 1948 |

FOREIGN PATENTS

| Number | Country | Date |
|---|---|---|
| 485,901 | Great Britain | May 26, 1938 |